United States Patent
Iwami et al.

(10) Patent No.: US 12,442,233 B2
(45) Date of Patent: Oct. 14, 2025

(54) OPEN-AND-CLOSE STRUCTURE FOR CAP AND CHARGING CONNECTOR

(71) Applicant: Yazaki Corporation, Tokyo (JP)

(72) Inventors: Tomokazu Iwami, Kakegawa (JP); Yoshinobu Furuya, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 294 days.

(21) Appl. No.: 18/470,515

(22) Filed: Sep. 20, 2023

(65) Prior Publication Data

US 2024/0133223 A1 Apr. 25, 2024
US 2024/0229529 A9 Jul. 11, 2024

(30) Foreign Application Priority Data

Oct. 20, 2022 (JP) ................ 2022-168219

(51) Int. Cl.

| | |
|---|---|
| *H01R 13/447* | (2006.01) |
| *B60L 53/16* | (2019.01) |
| *E05D 5/02* | (2006.01) |
| *E05D 11/10* | (2006.01) |
| *E05D 3/02* | (2006.01) |
| *E05F 1/12* | (2006.01) |

(52) U.S. Cl.
CPC .......... *E05D 11/1071* (2013.01); *B60L 53/16* (2019.02); *E05D 5/0207* (2013.01); *H01R 13/447* (2013.01); *E05D 3/02* (2013.01); *E05F 1/1253* (2013.01); *E05Y 2201/638* (2013.01); *E05Y 2900/53* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 2,452,922 A * | 11/1948 | Gonsett | H01R 13/447 |
| | | | 174/67 |
| 2002/0130531 A1 | 9/2002 | Leitner | |
| 2021/0265764 A1* | 8/2021 | Hachadorian | H01R 13/5213 |

FOREIGN PATENT DOCUMENTS

| | | | |
|---|---|---|---|
| DE | 202012100856 U1 * | 3/2012 | ........... H01R 13/447 |
| EP | 0898331 A1 * | 2/1999 | ........... H01R 13/447 |
| JP | 2015-115123 A | 6/2015 | |
| WO | WO-2019143350 A1 * | 7/2019 | ............ E05F 1/1261 |

* cited by examiner

*Primary Examiner* — Tho D Ta
(74) *Attorney, Agent, or Firm* — Sughrue Mion, PLLC

(57) ABSTRACT

An open-and-close structure 1A for a cap includes a housing 2, a cap 3 rotatably supported on the housing 2, and a biasing member 43 configured to apply a biasing force near a rotation shaft 42 of the cap 3, wherein open position-maintaining means configured to maintain the cap 3 at an open position by a biasing force of the biasing member 43 and reaction force application means configured to apply a reaction force in a closing direction by the biasing member 43 to the cap 3 in response to a further movement of the cap 3 in an open direction from the open position are provided on at least one of a support portion 32 that is a cap-side sliding contact portion or a sliding contact member 45 that is a biasing member-side sliding contact portion.

10 Claims, 5 Drawing Sheets

PRIOR ART

OPEN-AND-CLOSE STRUCTURE FOR CAP AND CHARGING CONNECTOR

TECHNICAL FIELD

The present invention relates to an open-and-close structure for a cap and a charging connector.

BACKGROUND

Conventionally, vehicles such as electric vehicles (EV) and plug-in hybrid vehicles (PHEV) use a charging connector on the vehicle side that has a cap that can be opened and closed so as to cover the connection portion where the power supply connector is connected (see, for example, Patent Document 1). In the charging connector, a biasing member such as a spring biases the cap in the opening direction. When the cap is in the closed state, the cap is latched to the housing, but when the operator releases this latching, the cap is opened by the biasing force of the biasing member.

As such an open-and-close structure for a cap, the structure illustrated in FIGS. 7A and 7B can be considered. FIGS. 7A and 7B are cross-sectional views of a charging connector 100. The charging connector 100 is provided on a vehicle such as an electric vehicle (EV) or a plug-in hybrid vehicle (PHEV), and is electrically connected to a power supply connector outside the vehicle for charging the battery mounted on the vehicle. The charging connector 100 is fixed to a body panel of the vehicle or the like. The open-and-close structure for the cap includes a housing 101 and a cap 110.

The housing 101 is fixed to the vehicle and connected to a power supply connector from outside the vehicle, and includes a housing body 102 having a cylindrical hood portion, a cap support portion 103, and a cap lock portion 104. The cap supporting portion 103 rotatably supports the cap 110 with a rotating shaft 105, and includes a biasing member 106 that biases the cap 110 in the closing direction and the opening direction. The biasing member 106 has a compression spring 107 and a sliding contact member 108 having a convex arc-shaped sliding contact surface (cam surface).

The cap 110 includes a cap body 111 covering the hood portion of the housing body 102, a support portion 112 rotatably supported by the rotation shaft 105, and a contact portion 113 extending on the opposite side of the rotating shaft 105 from the cap body 111. The support portion 112 includes a cap-side cam surface that makes a sliding contact with the sliding contact member 108 of the biasing member 106. The cap-side cam surface includes a first cam surface 114 that extends with a gradually increasing distance with reference to the rotation shaft 105, a cam tip surface 115 at which the distance with reference to the rotation shaft 105 is the greatest, and a second cam surface 116 that extends beyond the cam tip surface 115 on the side opposite the first cam surface 114 with a gradually decreasing distance with reference to the rotation shaft 105.

With the above-described open-and-close structure for the cap, as illustrated in FIG. 7A, when the sliding contact member 108 of the biasing member 106 comes into contact with the first cam surface 114, the push-up force from the compression spring 107 acts on the support portion 112, and the cap 110 is latched to the cap lock portion 104 while being biased in the closing direction. Conversely, when the operator cancels latching of the cap lock portion 104 to open the cap 110 against the biasing force of the compression spring 107 and moves the cap 110 to the open position as illustrated in FIG. 7B, the sliding contact member 108 of the biasing member 106 comes into contact with the second cam surface 116. In this state, the push-up force from the compression spring 107 acts on the support portion 112 to bias the cap 110 in the open direction to bring the contact portion 113 into contact with the housing 101. At the open position, while the cap 110 is biased in the open direction by the biasing member 106, the contact portion 113 is in contact with the housing 101 to maintain the open position.

RELATED ART

Patent Document

[Patent Document 1] JP 2015-115123 A

SUMMARY OF THE INVENTION

Problem to be Solved by the Invention

With the conventional open-and-close structure for the cap, however, the cap is maintained at the open position by bringing the contact portion of the cap into contact with the housing, and therefore, when an excessive load is further applied to the cap in the open direction, the cap may be broken.

It is an object of the present invention to provide an open-and-close structure for a cap and a charging connector capable of reducing the chance of breakage.

Solution to Problem

In order to solve the above problems and achieve the object, an open-and-close structure for a cap according to the present invention includes a housing containing an electrical connection portion, a cap rotatably supported on the housing and configured to, at a closed position, close an opening portion of the housing and, at an open position, expose the electrical connection portion through the opening portion, and a biasing member configured to apply a biasing force near a rotation shaft of the cap, wherein the cap opens and closes while a cap-side sliding contact portion provided on the cap and a biasing member-side sliding contact portion provided on the biasing member make a sliding contact with each other, and wherein open position-maintaining means configured to maintain the cap at the open position by a biasing force of the biasing member and reaction force application means configured to apply a reaction force in a closing direction by the biasing member to the cap in response to a further movement of the cap in an open direction from the open position are provided on at least one of the cap-side sliding contact portion or the biasing member-side sliding contact portion.

Advantageous Effects of the Invention

According to the present invention, even if a load in the open direction acts on the cap at the open position, the reaction force by the reaction force application means can act in the closing direction to maintain the cap at the open position, so that the chance of breaking the cap can be reduced.

DETAILED DESCRIPTION OF THE EXEMPLARY EMBODIMENT

Figure 1:
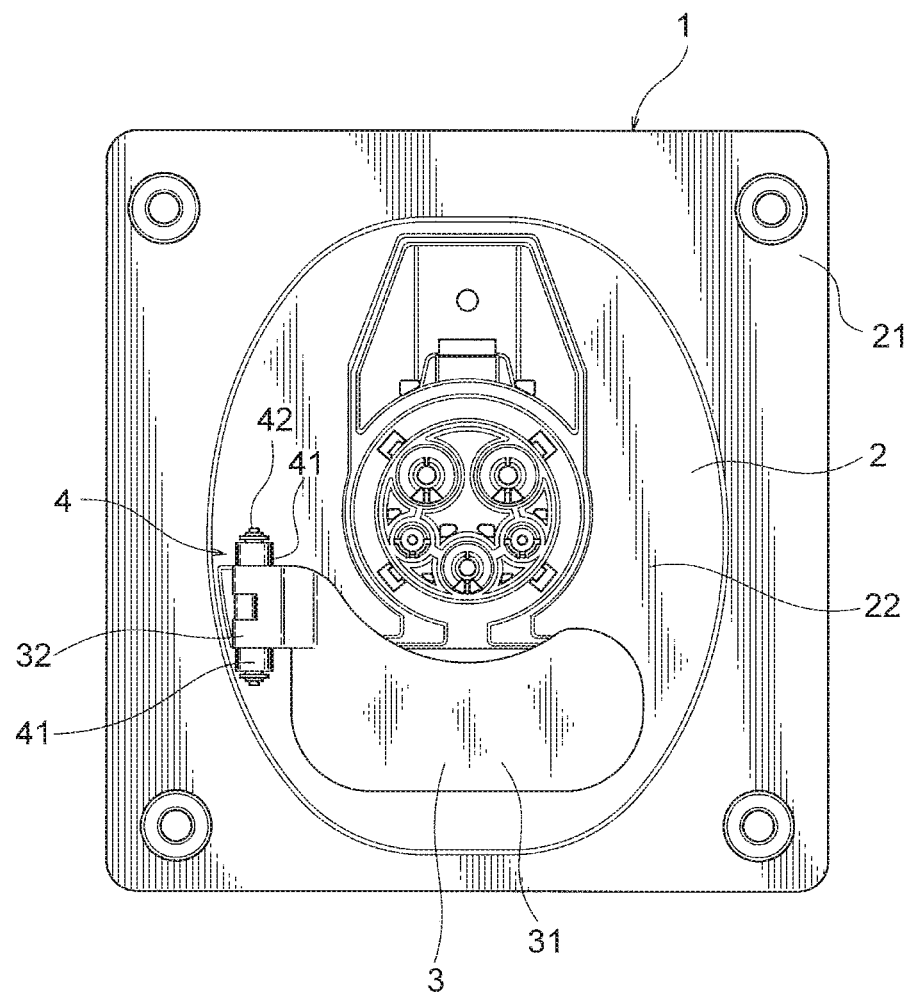
FIG. 1 is a front view of a charging connector according to one embodiment of the present invention.

An open-and-close structure 1A for a cap and a charging connector 1 according to an embodiment of the present invention are hereinafter explained with reference to FIGS. 1 to 6. The charging connector 1 according to the present embodiment is provided in a vehicle such as an electric vehicle (EV) or a plug-in hybrid vehicle (PHEV), and is electrically connected to a power supply connector outside the vehicle for charging the battery mounted in the vehicle. The charging connector 1 is fixed to a body panel of the vehicle or the like. The open-and-close structure 1A of the cap includes a housing 2, a cap 3, and a cap support portion 4.

The housing 2 contains an electrical connection portion that is electrically connected through an opening portion to the power supply connector outside the vehicle. The housing 2 includes a vehicle attachment portion 21 and a housing body 22. The vehicle attachment portion 21 is provided in a flange shape protruding from the housing body 22, and is provided with through holes at the four corners for attachment to a body panel (not illustrated). The vehicle attachment portion 21 is fixed to the body panel by inserting bolts (not illustrated) into the four through holes and fastening them to the body panel. The housing body 22 is made of a hollow member of synthetic resin, and includes an opening portion that opens toward the outside of the vehicle. The housing body 22 contains terminal metal pieces (not illustrated) connected to electric wires (not illustrated) extending from a battery (not illustrated) in the vehicle.

The cap 3 is made of synthetic resin and formed in a flat plate shape, and includes a cap body 31 that covers and closes the opening portion of the housing body 22, and a support portion 32 that is continuous to one end side (left side in FIG. 1) of the cap body 31. A rotation shaft 42 of the cap support portion 4 penetrates the support portion 32, so that the cap 3 is supported by the housing 22 in such a manner as to be rotatable around the rotation shaft 42. When the operator lifts the right end of the cap 3 in FIG. 1, the cap 3 moves upward to the left to open.

Figure 2:
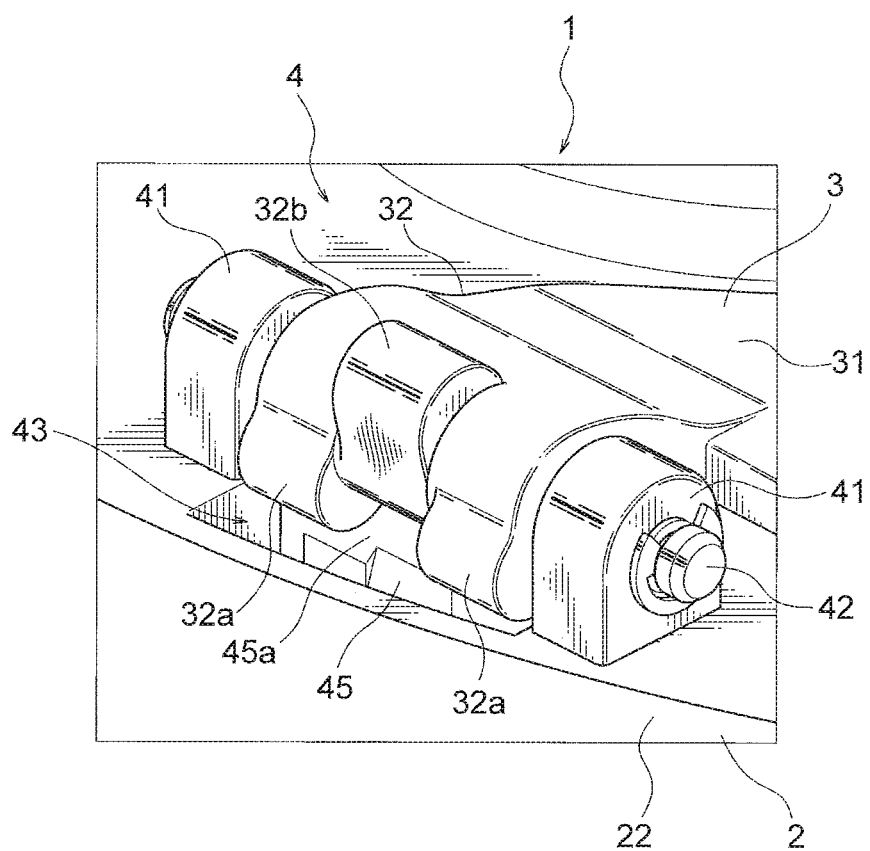
FIG. 2 is a perspective view illustrating an open-and-close structure for a cap of the charging connector.
Figure 3:
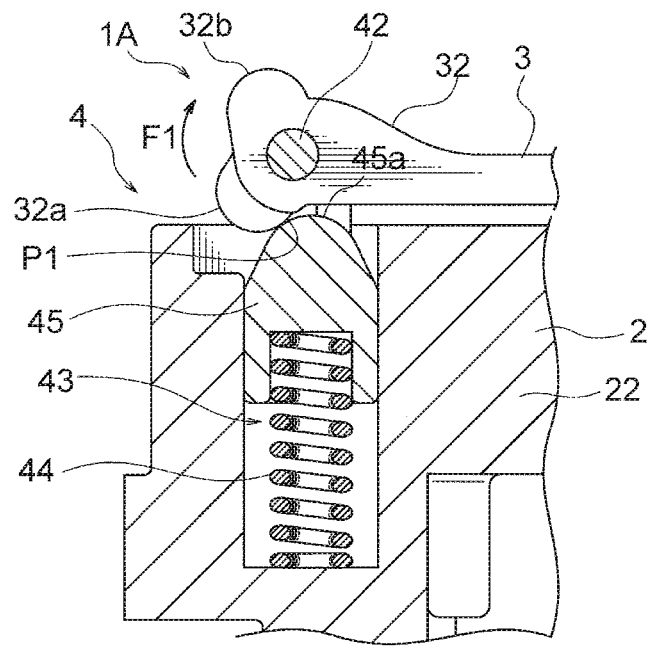
FIG. 3 is a cross-sectional view illustrating the open-and-close structure for the cap at the cap-closed position.
Figure 4:
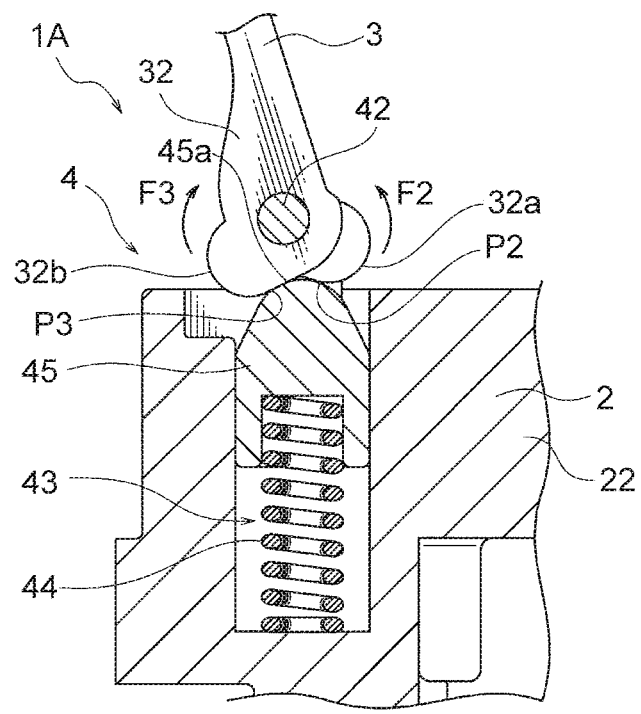
FIG. 4 is a cross-sectional view illustrating the open-and-close structure for the cap at the cap-open position.

As illustrated in FIGS. 2 to 4, the cap support portion 4 includes a pair of bearings 41 vertically provided on the top surface of the housing body 22, a rotation shaft 42 axially supported by the pair of bearings 41, and a biasing member 43 provided in a recessed portion that is recessed from the top surface of the housing body 22. The biasing member 43 applies a biasing force to the support portion 32 of the cap 3 in a direction toward the rotation shaft 42 (upward). The biasing member 43 includes a compression spring 44 and a sliding contact member 45 fixed to the tip side of the compression spring.

A convex arc-shaped biasing cam surface 45a that is convex toward the rotation shaft 42 is formed on the tip side (upper side) of the sliding contact member 45. The biasing cam surface 45a is pressed against the support portion 32 of the cap 3 by the biasing force of the compression spring 44, and the support portion 32 and the biasing cam surface 45a make sliding contact according to the rotation of the cap 3. Specifically, the support portion 32 constitutes a cap-side sliding contact portion, and the sliding contact member 45 constitutes a biasing member-side sliding contact portion.

The support portion 32 of the cap 3 is provided with first cam surfaces 32a in an arc-shape convex in a direction away from the rotation shaft 42, and a second cam surface 32b different in circumferential position from the first cam surfaces 32a and in an arc-shape convex in a direction away from the rotation shaft 42. The first cam surfaces 32a are provided to constitute a pair at both ends in the axial direction along the rotation shaft 42, and the second cam surface 32b is provided between the first cam surfaces 32a constituting the pair. The first cam surfaces 32a and the second cam surface 32b are formed in an arc shape with a gradually increasing distance with reference to the rotation shaft 42 from one side to another side in the circumferential direction around the rotation shaft 42, the arc shape having a top portion where the distance with reference to the rotation shaft 42 is the maximum, the arc shape gradually approaching the rotation shaft 42 upon passing the top portion.

FIG. 3 is a view illustrating a state in which the cap 3 is at the closed position, i.e., in a state in which the opening portion of the housing body 22 is closed by the cap body 31 of the cap 3. As illustrated in FIG. 3, when the cap 3 is at the closed position, the biasing cam surface 45a of the sliding contact member 45 comes into contact with a contact portion P1 on one side (counterclockwise side of FIG. 3) with respect to the top portions of the first cam surfaces 32a of the support portion 32 of the cap 3. In this manner, the biasing cam surface 45a comes into contact with the contact portion P1 of the first cam surfaces 32a, so that the push-up force by the biasing force of the compression spring 44 acts on the first cam surfaces 32a, and accordingly, a force F1 is applied to the cap 3 to rotate the cap 3 in the closing direction. Specifically, contacting of the biasing cam surface 45a with the contact portion P1 of the first cam surfaces 32a constitutes closed position-maintaining means for maintaining the cap 3 at the closed position.

FIG. 4 is a view illustrating the cap 3 at the open position. As illustrated in FIG. 4, when the cap 3 is at the open position, the biasing cam surface 45a of the sliding contact member 45 comes into contact with a first contact portion P2 on the other side (i.e., clockwise side in FIG. 4) with respect to the top portions of the first cam surfaces 32a of the support portion 32 of the cap 3. Furthermore, the biasing cam surface 45a comes into contact with a second contact portion P3 on one side (i.e., counterclockwise side in FIG. 4) with respect to the top portion of the second cam surface 32b of the support portion 32. In this manner, the biasing cam surface 45a comes into contact with both the first contact portion P2 and the second contact portion P3, so that the push-up force by the biasing force of the compression spring 44 acts on the first cam surfaces 32a and the second cam surface 32b. Accordingly, both a force F2 for rotating the cap 3 in the open direction and a force F3 for rotating the cap 3 in the closing direction act on the cap 3, and these forces F2 and F3 are balanced. Therefore, contacting of the biasing cam surface 45a with both the first contact portion P2 and the second contact portion P3 constitutes open position-maintaining means for maintaining the cap 3 at the open position.

Figure 5:
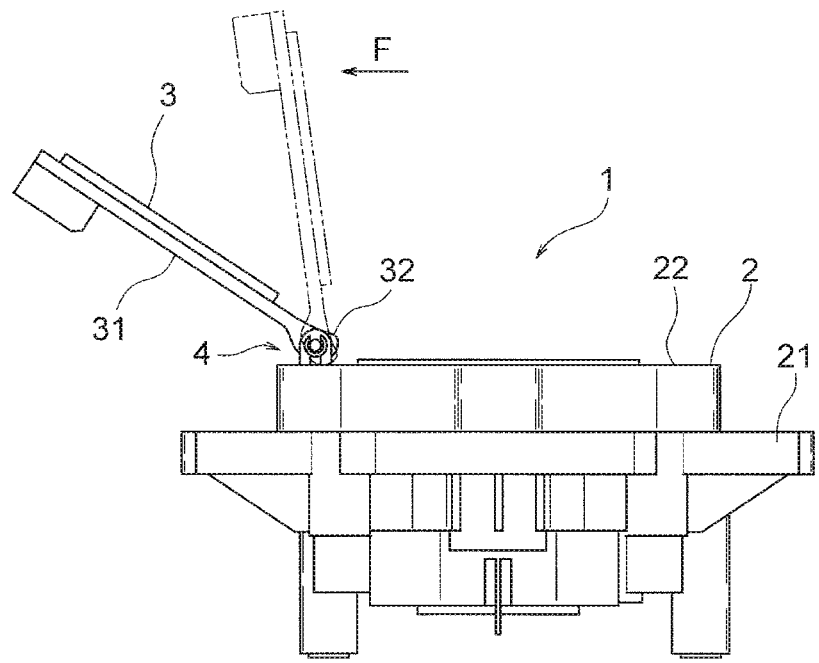
FIG. 5 is a side view illustrating a state in which an excessive load is applied to the cap at the open position.
Figure 6:
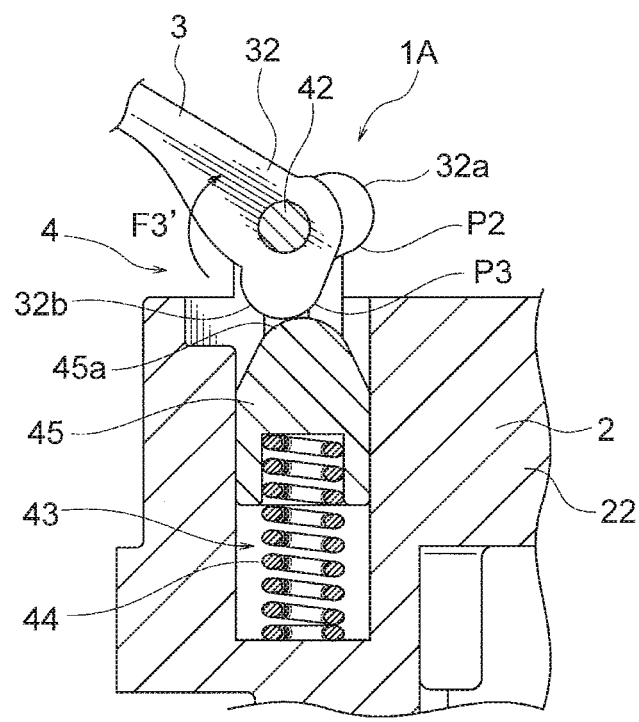
FIG. 6 is a cross-sectional view illustrating the open-and-close structure for the cap when an excessive load is applied.
Figure 7A:
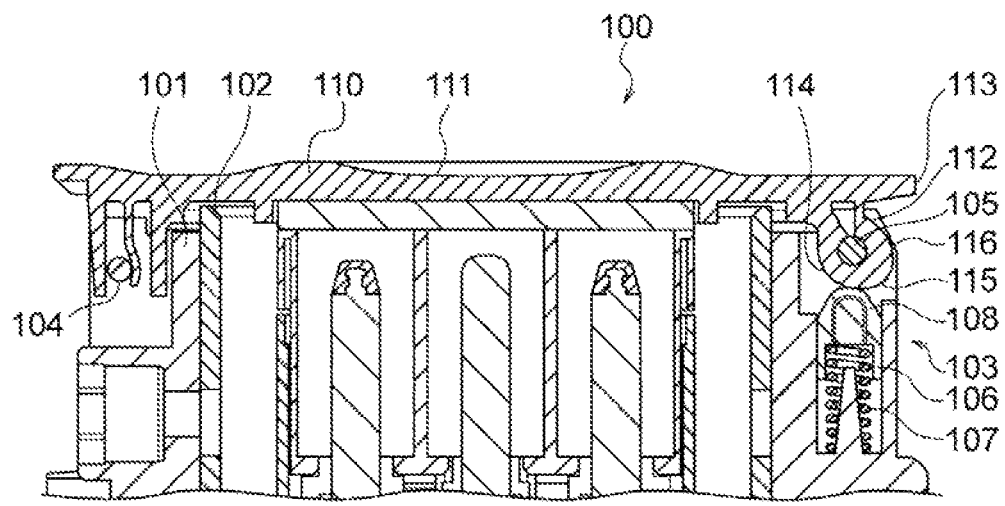
FIGS. 7A and 7B are cross-sectional views illustrating an open-and-close structure for a cap in a conventional charging connector.
Figure 7B:
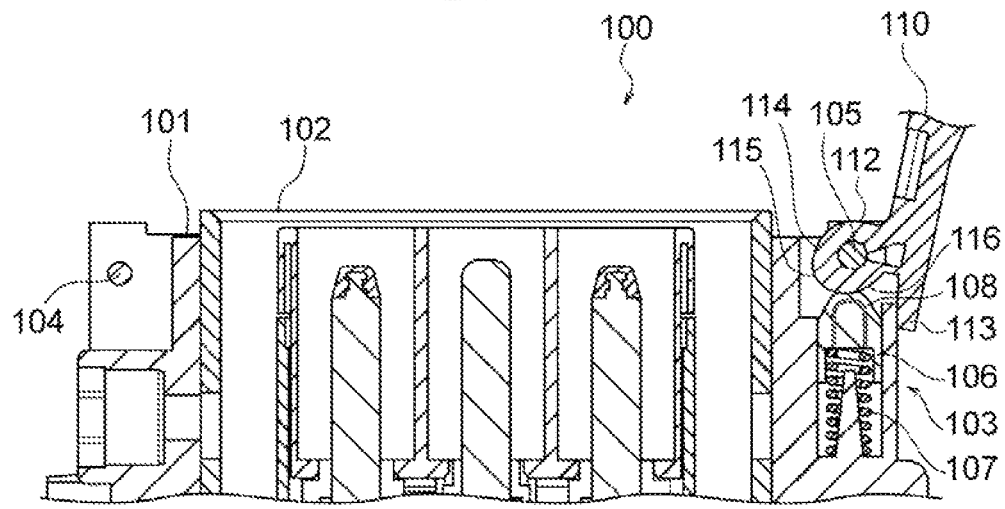

FIGS. 5 and 6 are views illustrating a state in which an excessive load F acts on the cap 3 at the open position (i.e., a position indicated by long dashed double-short dashed lines), and the cap 3 further rotates in the open direction from the open position. As illustrated in FIG. 6, when the cap 3 further rotates from the open position, the biasing cam surface 45a of the sliding contact member 45 comes into contact with the top portion side with respect to the second contact portion P3 of the second cam surface 32b of the support portion 32 of the cap 3. In this manner, the biasing cam surface 45a comes into contact with the position beyond the second contact portion P3, so that the push-up force caused by the biasing force of the compression spring 44 strongly acts on the second cam surface 32b, and accordingly, a force F3' for rotating the cap 3 in the closing direction acts on the cap 3. The force F3', which is a reaction force against the excessive load F, is larger than the force F3 at the open position, so that the cap 3 is easily rotated back in the closing direction. In other words, contacting of the biasing cam surface 45a with the position beyond the second contact portion P3 of the second cam surface 32b constitutes reaction force application means for causing the reaction force to act on the cap 3 to rotate the cap 3 back to the open position.

According to the open-and-close structure 1A for the cap 3 and charging connector 1 of the present embodiment as described above, even if the excessive load F in the open direction acts on the cap 3 at the open position, the reaction force F3' by the reaction force application means can act in the closing direction to maintain the cap 3 at the open position, so that the chance of breaking the cap 3 can be reduced. At this occasion, because the force F3', which is a reaction force against the excessive load F, is larger, the cap 3 can be reliably rotated back in the closing direction to maintain the open position.

Furthermore, when the cap 3 is at the open position, the biasing cam surface 45a comes into contact with both the first contact portion P2 and the second contact portion P3, so that the force F2 for rotating the cap 3 in the open direction and the force F3 for rotating the cap 3 in the closing direction can be balanced. With the open position-maintaining means configured in this manner, the cap 3 can be reliably maintained at the open position.

Furthermore, when the cap 3 is at the closed position, the biasing cam surface 45a comes into contact with the contact portion P1 of the first cam surfaces 32a, so that the force F1 for rotating the cap 3 in the closing direction can act on the cap 3. With the closed position-maintaining means configured in this manner, the cap 3 can be reliably maintained at the closed position. Accordingly, a cap lock portion for locking the cap 3 at the closed position can be omitted.

Although the embodiment of the open-and-close structure for the cap has been hereinabove described in detail with reference to the drawings, the specific configuration is not limited to the above-described embodiment, and even if there is a change in design without departing from the scope of the present invention, the configuration with such change is also included in the present invention.

For example, in the above-described embodiment, a configuration has been employed in which the first cam surfaces 32a and the second cam surface 32b are provided on the support portion 32 of the cap 3, and the biasing cam surface 45a that makes a sliding contact with the first cam surfaces 32a and the second cam surface 32b is provided on the sliding contact member 45 of the biasing member 43. However, the portion provided with each cam surface and the shape of the cam surface is not limited to those of the above-described embodiment. Specifically, first cam surfaces and a second cam surface may be provided on the sliding contact member 45 of the biasing member 43, and a sliding contact portion that makes a sliding contact with these first cam surfaces and second cam surface may be provided on the support portion 32 of the cap 3. Also, each cam surface is not limited to be formed in a convex arc-shape, and may be a triangular shape or a recessed shape.

LIST OF REFERENCE SIGNS 1 charging connector
1A open-and-close structure for cap
2 housing
3 cap
4 cap support portion
32 support portion (cap-side sliding contact portion)
32a first cam surface
32b second cam surface
43 biasing member
45 sliding contact member (biasing member-side sliding contact portion)
45a biasing cam surface
P2 first contact portion
P3 second contact portion

What is claimed is:

1. An open-and-close structure for a cap, comprising:
a housing containing an electrical connection portion;
the cap rotatably supported on the housing and configured to, at a closed position, close an opening portion of the housing and, at an open position, expose the electrical connection portion through the opening portion; and
a biasing member configured to apply a biasing force near a rotation shaft of the cap,
wherein the cap opens and closes while a cap-side sliding contact portion provided on the cap and a biasing member-side sliding contact portion provided on the biasing member make a sliding contact with each other, and
wherein open position-maintaining means configured to maintain the cap at the open position by a biasing force of the biasing member and reaction force application means configured to apply a reaction force in a closing direction by the biasing member to the cap in response to a further movement of the cap in an open direction from the open position are provided on at least one of the cap-side sliding contact portion or the biasing member-side sliding contact portion.

2. The open-and-close structure for the cap according to claim 1, wherein closed position-maintaining means configured to maintain the cap at the closed position by the biasing force of the biasing member is provided on at least one of the cap-side sliding contact portion or the biasing member-side sliding contact portion.

3. The open-and-close structure for the cap according to claim 2, wherein the biasing member-side sliding contact portion is formed to have a biasing cam surface in an arc shape convex toward the rotation shaft of the cap,
the cap-side sliding contact portion includes a first cam surface in an arc shape convex toward a direction away from the rotation shaft and a second cam surface that is different in a circumferential position from the first cam surface, the second cam surface being in an arc shape convex toward the direction away from the rotation shaft, and the open position-maintaining means is constituted by contacting of the biasing cam surface with both a first contact portion of the first cam surface and a second contact portion of the second cam surface.

4. The open-and-close structure for the cap according to claim 3, wherein the reaction force application means is constituted by contacting of the biasing cam surface with a position beyond the second contact portion of the second cam surface.

5. The open-and-close structure for the cap according to claim 3, wherein the closed position-maintaining means is constituted by contacting of the biasing cam surface with a side of the first cam surface opposite to the first contact portion.

6. A charging connector comprising:

the open-and-close structure for the cap according to claim 1, wherein the charging connector is configured to electrically connected to a power supply connector outside a vehicle.

7. A charging connector comprising:

the open-and-close structure for the cap according to claim 2, wherein the charging connector is configured to electrically connected to a power supply connector outside a vehicle.

8. A charging connector comprising:

the open-and-close structure for the cap according to claim 3, wherein the charging connector is configured to electrically connected to a power supply connector outside a vehicle.

9. A charging connector comprising:

the open-and-close structure for the cap according to claim 4, wherein the charging connector is configured to electrically connected to a power supply connector outside a vehicle.

10. A charging connector comprising:

the open-and-close structure for the cap according to claim 5, wherein the charging connector is configured to electrically connected to a power supply connector outside a vehicle.

* * * * *